(12) United States Patent
Taylor

(10) Patent No.: US 6,216,831 B1
(45) Date of Patent: Apr. 17, 2001

(54) FRICTIONLESS HYDRAULIC DAMPER AND DAMPER-SNUBBER

(75) Inventor: Douglas P. Taylor, N. Tonawanda, NY (US)

(73) Assignee: Tayco Developments, Inc., North Tonawanda, NY (US)

( * ) Notice: Subject to any disclaimer, the term of this patent is extended or adjusted under 35 U.S.C. 154(b) by 0 days.

(21) Appl. No.: 09/334,854

(22) Filed: Jun. 17, 1999

(51) Int. Cl.[7] ........................................... F16F 9/49
(52) U.S. Cl. ................ 188/280; 188/282.6; 188/322.17; 188/312; 267/134
(58) Field of Search .................................. 188/312, 280, 188/378, 298, 317, 282.6, 322.17; 267/225, 122, 136, 186, 221, 134

(56) References Cited

U.S. PATENT DOCUMENTS

| | | | |
|---|---|---|---|
| 4,638,895 | * 1/1987 | Taylor et al. | 188/280 |
| 4,741,516 | * 5/1988 | Davis | 267/64.13 |
| 4,768,627 | * 9/1988 | Taylor | 188/280 |
| 4,815,574 | * 3/1989 | Taylor et al. | 188/280 |
| 5,487,454 | * 1/1996 | Klembczyk et al. | 188/298 |
| 5,727,663 | * 3/1998 | Taylor | 188/378 |

* cited by examiner

Primary Examiner—Robert J. Oberleitner
Assistant Examiner—Devon Kramer
(74) Attorney, Agent, or Firm—Joseph P. Gastel

(57) ABSTRACT

A damper including a cylinder, opposite end walls in the cylinder, an elongated shaft mounted for axial movement in seals in the end walls, a piston head on the shaft between the end walls, fluid-tight bellows mounted in sealed relationship between the shaft and the end walls, fluid in the cylinder and in the bellows, and flexible washers mounted between the shaft and the end walls for maintaining the shaft centered in the seals. The damper can function as a snubber when it utilizes a valved piston head.

31 Claims, 5 Drawing Sheets

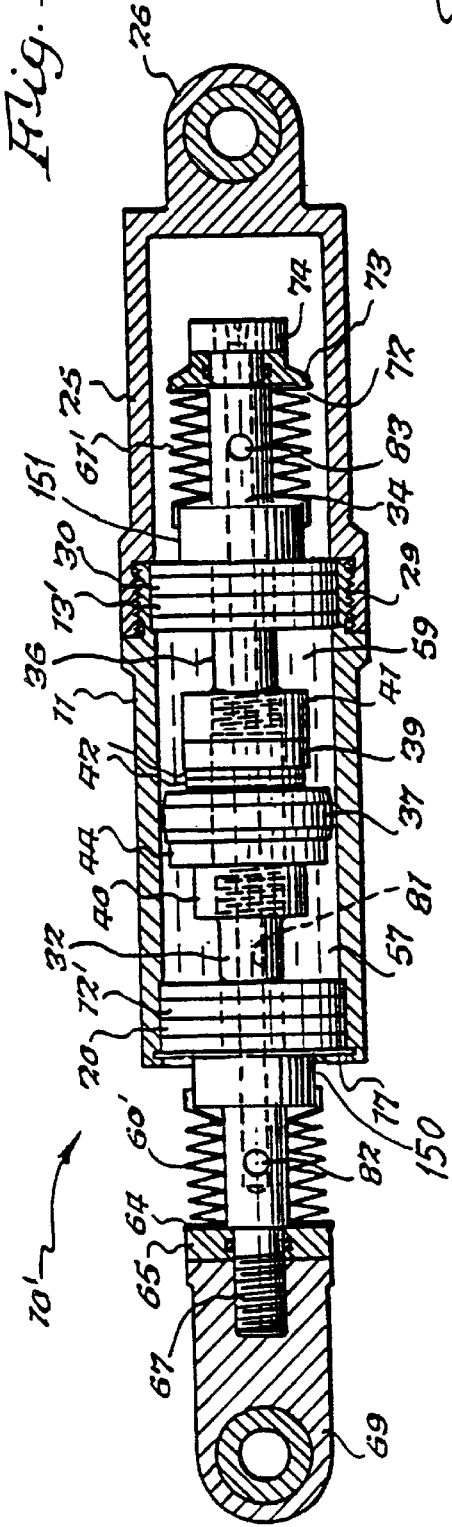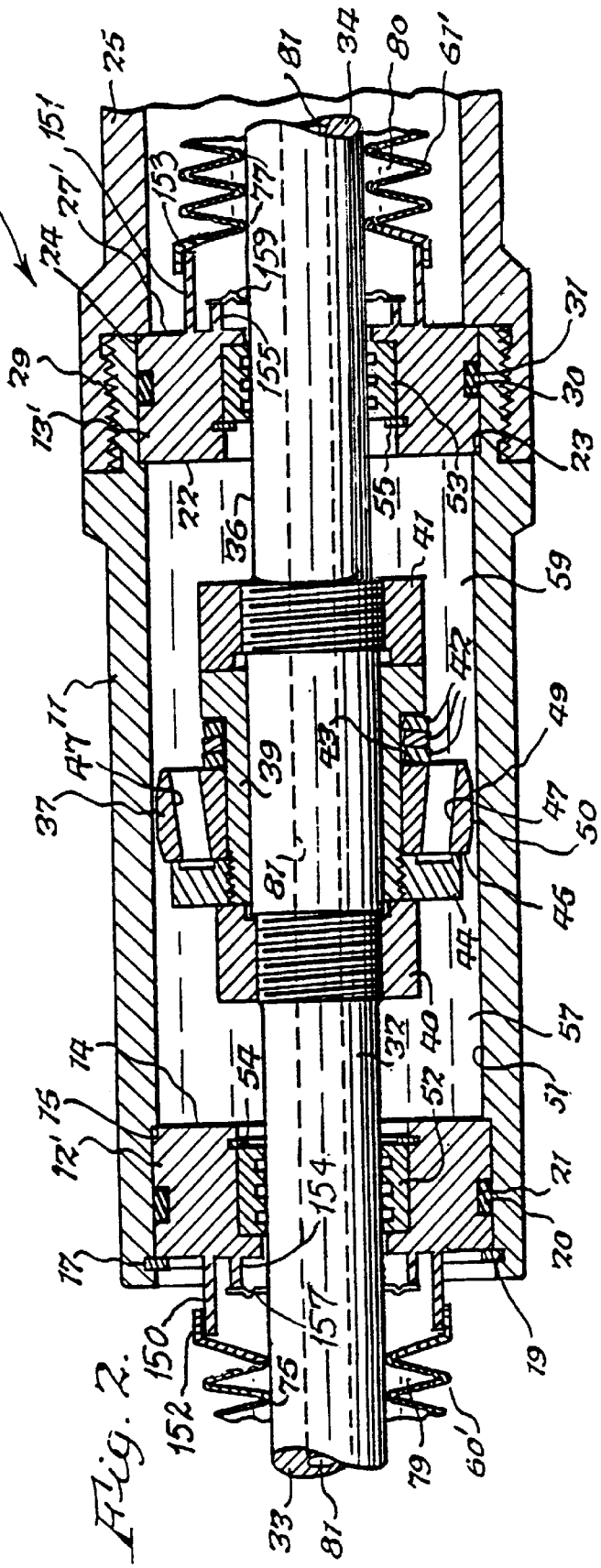

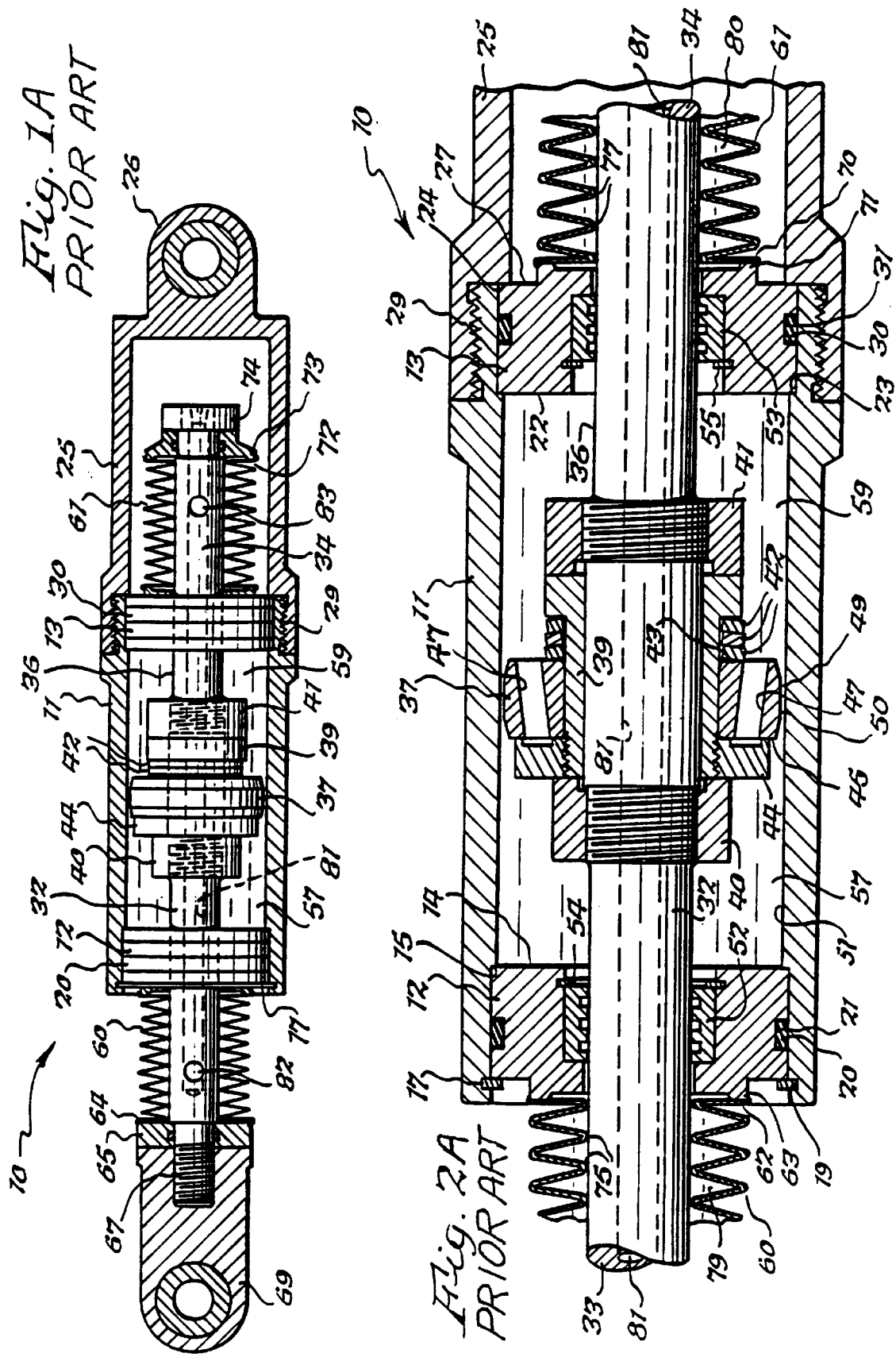

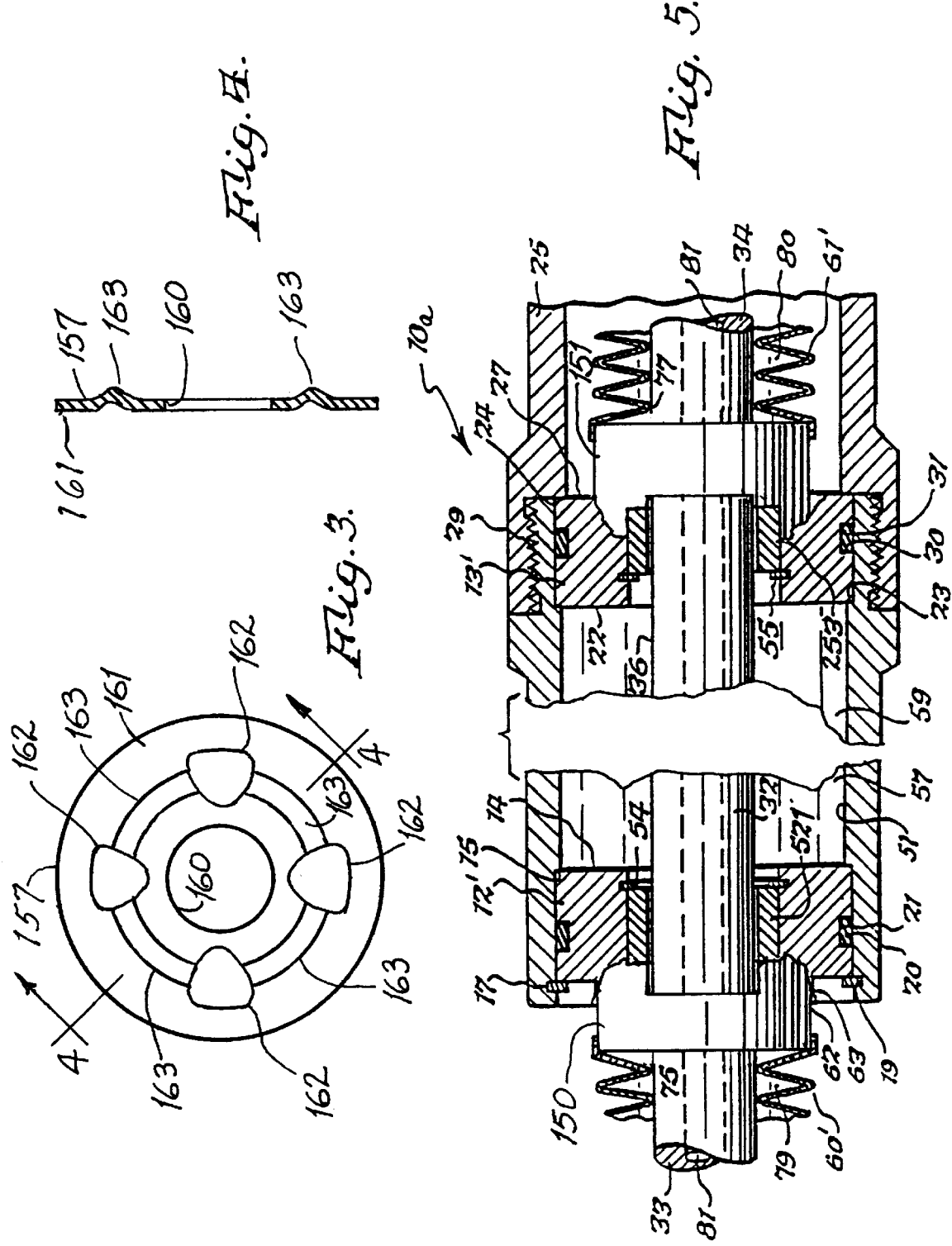

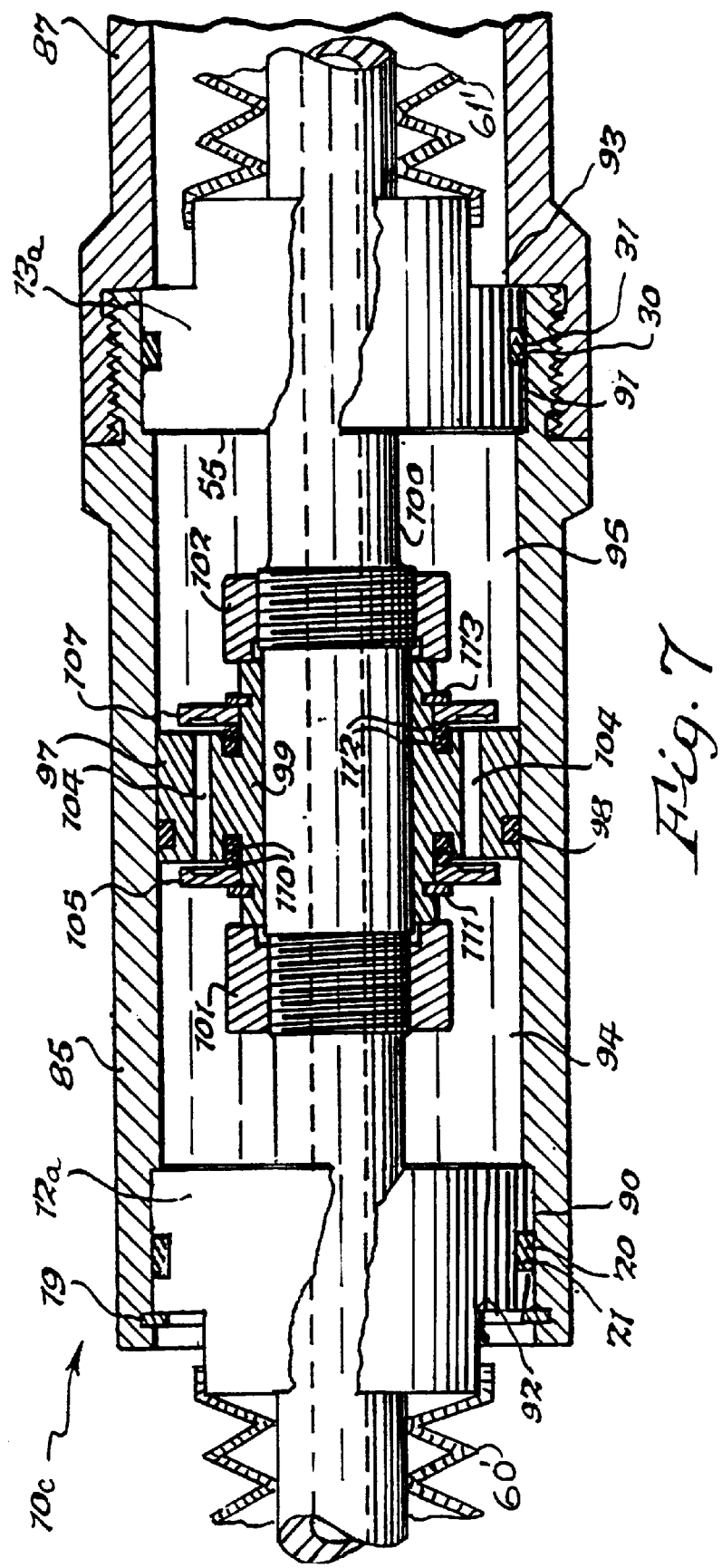

FRICTIONLESS HYDRAULIC DAMPER AND DAMPER-SNUBBER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved frictionless hydraulic damper and frictionless hydraulic damper-snubber which will remain frictionless during extremely small vibrational movements.

By way of background, in U.S. Pat. Nos. 4,638,895 and 4,768,627 frictionless-hydraulic dampers and frictionless hydraulic damper-snubbers are disclosed. These devices worked well in a majority of applications in which they were used. As stated in these patents, the frictionless performance was due to the use of labyrinth seals or bushings which had a thin film of hydraulic fluid built up between the bushing and the shaft to eliminate metal-to-metal friction as the damper stroked. However, in situations where the vibrations to be damped are about 0.001 inches and smaller in amplitude, there was no thin film of fluid formed between the seal and the shaft so as to produce a hydrodynamic bearing, and thus the parts touched in metal-to-metal contact so that frictionless operation was not achieved. The structure of the present invention overcomes the foregoing deficiency.

BRIEF SUMMARY OF THE INVENTION

It is one object of the present invention to provide a frictionless damper and frictionless damper-snubber which is capable of damping vibrations of about 0.001 inches and smaller and still maintain its frictionless operation.

Another object of the present invention is to provide an improved hydraulic damper and damper-snubber in which frictionless operation is obtained at very small vibrational amplitudes in a highly efficient manner. Other objects and attendant advantages of the present invention will readily be perceived hereafter.

The present invention relates to a damper comprising a cylinder, first and second opposite end walls in said cylinder, first and second seals in said first and second end walls, respectively, an elongated shaft mounted for axial movement in said first and second seals, a piston head on said shaft located between said first and second end walls, first and second fluid-tight bellows mounted in sealed relationship between said shaft and said first and second end walls, respectively, fluid in said cylinder and in said first and second bellows, and first and second flexible washers mounted between said shaft and said first and second end walls, respectively.

The present invention also relates to a damper-snubber which has the structure of the preceding paragraph and wherein the piston head includes orifices therein and valves associated therewith to block said orifices when the piston head velocity exceeds a predetermined value.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a view, partially in cross section, of one embodiment of the improved frictionless damper of the present invention;

FIG. 1A is a view similar to FIG. 1 but showing the prior art frictionless damper over which the present damper is an improvement;

FIG. 2 is an enlarged fragmentary cross sectional view of a portion of the frictionless damper of FIG. 1;

FIG. 2A is a view similar to FIG. 2 but showing the prior art frictionless damper over which the present damper is an improvement;

FIG. 3 a plan view of the flexible configured washer which is used to center the damper shaft on its supporting bushing;

FIG. 4 is a cross sectional view taken substantially along line 4—4 of FIG. 3;

FIG. 5 is a fragmentary cross sectional view similar to FIG. 2 but showing the shaft-centering structure of FIG. 2 added to an embodiments using simple bushings rather than labyrinth bushing;

FIG. 7 is a fragmentary view partially in cross section of a damper-snubber utilizing the centering structure of FIG. 6.

DETAILED DESCRIPTION OF THE INVENTION

Figure 6:
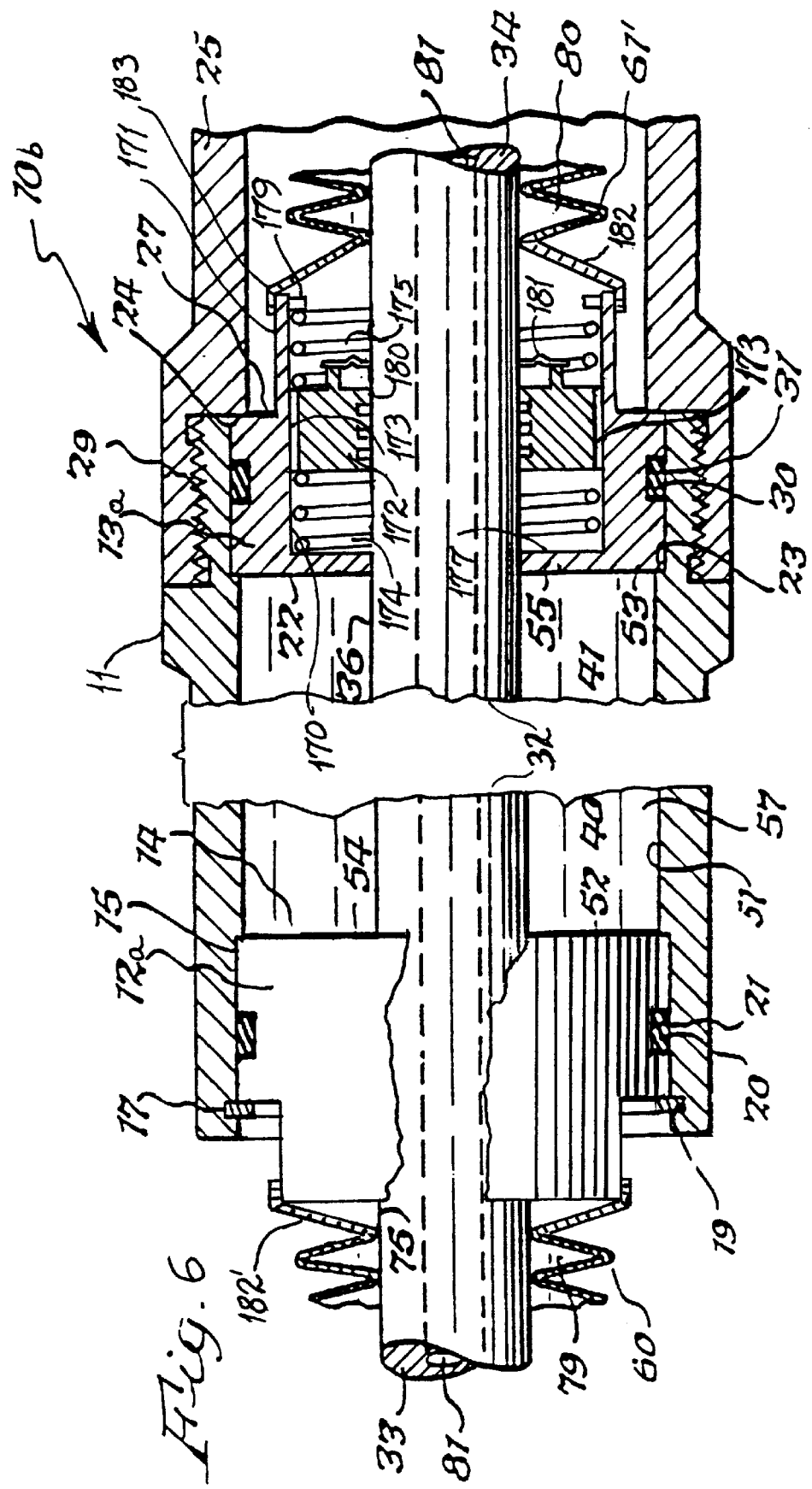
FIG. 6 is a fragmentary cross sectional view of another embodiment of a frictionless damper wherein the shaft has a longer axial movement than the embodiment of FIG. 1.

By way of introduction, the frictionless damper 10' of the present invention is an improvement over the frictionless damper 10 of U.S. Pat. No. 4,638,895 which is shown in FIGS. 1A and 2A. Identical numerals in FIGS. 1, 1A, 2 and 2A will represent identical elements of structure, and primed numerals in FIGS. 1 and 2 will represent modifications of structure represented by unprimed numerals in FIGS. 1A and 2A.

The frictionless damper 10' of FIGS. 1 and 2 comprises an annular cylinder 11 having cylindrical end walls 12' and 13' mounted therein. End wall 12' includes a side 14 which has its outer edge held in abutting relationship with annular shoulder 15 by split ring 17 which is suitably retained in groove 19. An O-ring seal 20 is located in groove 21 to provide sealing against leakage. The outer annular edge of face 22 of end wall 13' abuts shoulder 23 of cylinder 11, and the shoulder 24 of cylinder extension 25 bears against the outer edge of end wall face 27' to retain it in position. An O-ring 30 is located in groove 31 to provide sealing between end wall 13' and cylinder 11. Cylinder extension 25 is threaded onto cylinder 11 at 29, and it has an attachment member 26 at its outer end for attachment to an external object.

A shaft 32 has a central portion 36 which is located in the space between end wall faces 14 and 22 and it also includes outer end portions 33 and 34 which extend varying amounts through and beyond end walls 12' and 13', respectively, depending on the position of piston head 37 which is mounted on the central portion 36 of the shaft. Piston head 37 is mounted on sleeve 39 which is held in position by nuts 40 and 41 threadably secured to the shaft. A plurality of Bellville washers 42 bear against face 43 of piston 37, and valve member 44 bears against face 45 to normally close the plurality of circumferentially located bores 47. There is a clearance space 49 between the outer periphery 50 of piston head 37 and the inner surface 51 of cylinder 11. The clearance space 49 constitutes a fluidic damping orifice of the type disclosed in U.S. Pat. No. 3,722,640.

The outer end portions 33 and 34 of shaft 32 are supported for rectilinear sliding movement in labyrinth seals 52 and 53, respectively, suitably mounted in cavities in end walls 12' and 13', respectively, and retained therein by split rings 54 and 55, respectively. There is a slight clearance between shaft portions 33 and 34 and their labyrinth seals 52 and 53, respectively, to permit shaft 32 to float substantially frictionlessly therein, and thus there can be leakage of fluid from cylinder chambers 57 and 59 on opposite sides of piston head 37 through the seals. It will be appreciated that if O-ring seals or any other type of seals were used instead of the labyrinth seals 52 and 53 with their clearance, there would be a frictional drag on shaft 32 which could exceed approximately 2% of the rated load of the damper, and thus would be considered objectionable for many purposes. All of the foregoing structure designated by unprimed numerals is shown in FIGS. 1 and 2 of prior art U.S. Pat. No. 4,638,895 which are reproduced in FIGS. 1A and 2A, and the structure designated by primed numerals represents modifications of structure designated by unprimed numerals in FIGS. 1A and 2A.

In prior art U.S. Pat. No. 4,638,895, as shown in FIGS. 1A and 2A, in order to contain the above-mentioned leakage beyond labyrinth seals 52 and 53 within the cylinder 11, metal bellows seals 60 and 61 are mounted in fluid-tight relationship between end walls 12 and 13 and the portions of shaft ends 33 and 34 which extend outwardly beyond end walls 12 and 13. In this respect the annular end 62 of bellows seal 60 is secured, as by soldering or brazing, to annular lip 63 of end wall 12. The opposite annular end 64 of bellows 60 is attached as by soldering or brazing to ring 65 which is held on reduced end portion 67 of shaft 32 by attachment member 69 which connects shaft 32 to an external foreign object. The annular end portion 70 of bellows 61 is suitably attached to annular rim 71 of end wall 13 by soldering or brazing, and the opposite end 72 of bellows 61 is attached to annular member 73 by soldering or brazing. A nut 74 retains member 73 in position. The inner accordion edges 75 and 77 of bellows 60 and 61, respectively, are in substantially touching relationship with shaft portions 33 and 34, respectively, so that the bellows will remain centered relative to the shaft, that is, they will not distort as they are expanded and compressed with movement of shaft 32.

As explained in U.S. Pat. No. 4,638,895, and as shown in FIGS. 1A and 2A, hydraulic fluid fills the space in cylinder 11 between end walls 12 and 13 including cylinder chambers 57 and 59 on opposite sides of piston 37. Cylinder chamber 57 is in communication with bellows chamber 79 because of the leakage permitted by seal 52. Cylinder chamber 59 is in communication with bellows chamber 80 because of the leakage permitted by labyrinth seal 53. Chambers 79 and 80 are also filled with hydraulic fluid, and thus there is a continuous body of hydraulic fluid within chambers 57, 59, 79 and 80 and labyrinth seals 52 and 53. In order to permit communication between bellows chambers 79 and 80, a bore 81 is provided within shaft 32. Cross ports 82 and 83 are in communication with bore 81 and are also in communication with bellows chambers 79 and 80, respectively. Normally if piston head 37 is moving below a predetermined speed, there will be a low damping force caused by flow of hydraulic fluid between cylinder chambers 57 and 59 through the orifice or clearance 49, and the leakage induced by said low damping force past labyrinth seals 52 and 53 would be practically non-existent, and there will be a flow of fluid between bellows chambers 79 and 80. More specifically, as either bellows 60 or 61 expands, the other will contract and thus fluid will be forced into the expanding bellows by the contracting bellows through the conduits 81, 82 and 83. However, if piston head 37 should move in either direction at a velocity such that substantial damping pressures exist, there may be leakage through the labyrinth seal located in the cylinder chamber which is experiencing high pressure, and this leakage will be compensated for by the communication between bellows chambers 79 and 80. More specifically, additional fluid passing through the seal into one bellows chamber 79 or 80 will pass through conduits 81, 82 and 83 to the other bellows chamber. At this time there will be extremely low pressure in the other cylinder chamber, and this will tend to draw fluid into it from the adjacent bellows chamber. When the damper is in a low pressure condition, and when piston head 37 is moving at a low speed, the pressure in chambers 57, 59, 80 and 81 will be substantially equal. However, when there is a substantial increase in fluid pressure in either cylinder chamber 57 or 59 due to piston head movement at high speed, the pressures in bellows chambers 80 and 81 will still be at substantially the same low value as when the piston head was moving at low speed because of the throttling effect of the labyrinth seal through which leakage occurs. The maintaining of the low pressures in the bellows obviates their distortion and possible fracture which would otherwise occur if they were subjected to high pressures.

The specific valve 44, as shown in FIGS. 2 and 2A, functions in the following manner. If movement of piston head 37 to the left should exceed a predetermined velocity so that there was a pressure force on piston face 45 which was greater than the force exerted on piston face 43 by Bellville washers 42, piston head 37 will move to the right on sleeve 39 to thereby open ports 47 to permit communication therethrough between cylinder chamber 57 and cylinder chamber 59. Bellville washers 42 will return piston head 37 to the position shown in FIGS. 2 and 2A wherein valve 44 closes ports 47 after the total force on piston face 45 has been reduced to a value which is lower than the spring force of the Bellville washers 42. However, there is no pressure relief if piston 37 moves to the right because there can be no unseating of valve 44 relative to bores 47. It is to be understood that valve 44 will open only when the device functions as a damper in an overload condition when the pressure in cylinder chamber 57 exceeds a predetermined value.

The basic prior art metal bellows damper described above relative to FIGS. 1A and 2A worked well in a majority of applications in which it was used. The best feature appreciated by prior art users was the frictionless performance provided by the use of the labyrinth seals or bushings 52 and 53 because a thin film of hydraulic fluid was built up between the bushing and the shaft to eliminate metal-to-metal friction as the damper stroked. The above described metal bellows construction contained the hydraulic fluid inside the damper and also provided hermetic performance.

There are applications wherein damping is required wherein the vibrations are plus/minus 0.001 inches of amplitude, and sometimes as low as a few millions of an inch. In a situation wherein there were these tiny vibrational stroke levels in the amount of plus/minus 0.001 inches of amplitude or less, there was no thin film of fluid formed in the clearance between a bushing such as 52 and shaft 33 of FIG. 2A to produce a hydrodynamic bearing, and thus the parts touched in metal-to-metal contact so that the frictionless operation was not achieved. In this respect, under normal operating circumstances in the prior art device of FIG. 2A, that is, where the vibration is above plus/minus 0.001 inches, the normal output pressure of the damper causes a higher pressure in chambers 57 and 59 relative to the fluid in the bellows chambers 79 and 80, respectively. This higher pressure forces small amounts of fluid into the clearance between the bushings and the shaft, which produces the film of fluid which acts like a hydrodynamic bearing to provide frictionless operation. However, when vibration displacements of less than 0.001 inches were experienced, the damping pressures in chambers 57 and 59 were so low that the hydrodynamic film could not be formed to produce frictionless operation. The result was that friction was produced between the shaft and the bushings at such small displacements, notwithstanding that a frictionless damper operation was obtained under vibrational displacements which were higher than 0.001 inches.

In accordance with one aspect of the present invention, certain portions of the prior art structure of FIGS. 1A and 2A have been modified as shown in FIGS. 1, 2, 3 and 4 in order to provide frictionless damping operation when the vibrations are at amplitudes of 0.001 of an inch and even in the nano-inch range (1×10–9 inches). To accomplish the foregoing, certain structure has been placed in FIGS. 1, 2, 3 and 4. In this respect, as noted above, all numerals which are common to FIGS. 1 and 2 and 1A and 2A represent identical structure and therefore will not be repeated. However, as can be seen from FIGS. 1, 2, 3 and 4, the following modifications have been made to achieve the above-discussed desired results. End walls 12 and 13 of FIGS. 1A and 2A have been modified to be end walls 12' and 13', respectively, of FIGS. 1 and 2. In this respect, annular rings 150 and 151 are formed integrally with end walls 12' and 13', respectively. The ends of bellows 60' and 61' are soldered or brazed at 152 and 153, respectively, to the outer annular ends of annular rings 150 and 151, respectively. In addition, annular rings 154 and 155 are formed integrally with end walls 12' and 13', respectively. The end portions 33 and 34 of piston rod 32 are centered within the bores of the labyrinth bushings 52 and 53, respectively, by flexible metal configured washers 157 and 159, respectively, in the form of discs which are identical except that they are placed in mirror image relationship. The inner edge 160 (FIG. 3) of washer 157 is suitably attached as by welding to rod 32 and the outer peripheral edge 161 is attached to annular ring 154 as by welding. Washers 157 and 159 are fabricated of stainless steel and washer 157 has vent holes 162 therein and includes arcuate crimped configurations 163 extending between the vent holes. Thus, as shaft 32 vibrates back and forth, washers 157 and 159 maintain the shaft centered within the bores of labyrinth bearings 52 and 53. The arcuate crimped configurations 163 permit the radial distance between the center 160 and the outer edge portion 161 of washer 157 to elongate and contract as is necessary to accompany the vibratory movement of shaft 32 while maintaining the shaft centered in bushings 52 and 53. As noted above, washer 159 is the mirror image of washer 157 and it operates in the same manner relative to shaft end 34.

FIG. 5 discloses a modified embodiment 10a of FIGS. 1, 2, 3 and 4 wherein the only difference is the fact that bushings 521 and 253 are normal bushings with cylindrical bores which function as seals having a clearance with shaft 32 rather than the above-described labyrinth seals such as 52 and 53, respectively. However, the vibrations are dampened in the same manner and by the same structure shown within annular rings 150 and 151 in FIGS. 1, 2, 3 and 4. FIG. 5 is a modification of the structure shown in U.S. Pat. No. 4,768,627.

The dampers 10' and 10a of FIGS. 1–5 operate where the vibrations are less than 1,000th of an inch. However, there are also frictionless requirements for dampers which may have a stroke of up to ¼ of an inch or more and still have vibrations of approximately 1,000th of an inch. The embodiment of FIG. 6 provides a solution to this type of damping requirement. In the damper 10b, all numerals which are identical to those of FIGS. 1 and 2 denote like elements of structure. Also, the central portion of FIG. 2 showing the piston head 37 and associated structure on shaft 32 have been deleted from FIG. 6. However, it will be appreciated that this structure, which is not shown, is identical to that shown in FIG. 2. In the damper 10b the piston rod 32 is supported in a frictionless manner when it is subjected to extremely low vibrational amplitudes, such as those under 1,000th of an inch by washers of the same type shown above at 157 and 159. In addition, the damper 10b is still able to reliably function at much longer strokes, typically in the plus or minus ¼ inch range without rupturing the washers which can allow only limited movement.

In damper 10b, the end wall 13a is depicted in cross section in FIG. 6 and the end wall 12a is essentially a mirror image of end wall structure 13a. End wall 13a is mounted onto housing 11 in the same manner as discussed above relative to end wall 13'. End wall 12a is mounted onto housing 11 in the same manner as end wall 12' of FIG. 1. However, the internal structure of end wall 13a differs from the structure of end wall 13'. In this respect, it includes a bore 170, and it has an annular extension 171 which provides a continuation of bore 170. A labyrinth bushing 172 is provided in bore 170 and it has an outer edge which is clearanced to bore 170 and it has an inner edge which is clearanced to shaft 32. Springs 174 and 175 bear on opposite sides of bushing 172 so as to permit it to move axially on shaft 32. Spring 174 is positioned between wall 177 and bushing 172, and spring 175 is positioned between bushing 172 and snap ring 179. Bushing 172 has an annular projection 180, and a flexural washer 181 which may be identical to flexural washer 157 of FIGS. 3 and 4 has its outer periphery welded to annular projection 180 and its inner circular edge welded to shaft 32. A plurality of slots 173 are circumferentially spaced about the outer periphery of bushing 172. These slots are vents for venting fluid across the bushing seal so as not to impede its motion as it slides in its bore 170. End wall 13a is machined to have a close clearance to shaft 32 so that damping pressure does not cause high oil flows into the chamber defined by wall 170, which could build up pressure on bushing 172.

A bellows extension 182 has one end welded to annular member 171 at 183 and the opposite end coupled to bellows 61', as shown. A bellows extension 182' has one end welded to the annular member which is the mirror image counterpart of annular member 171 on end wall 12a, and the opposite end of bellows extension 182' is coupled to bellows 60'. End wall 12a is essentially a mirror image counterpart of end wall 13a which was described in detail above, and only the exterior portion of a part of end wall 12a is shown.

In operation of the embodiment of FIG. 6, small amplitude vibrations in the plus or minus 1,000th of an inch range and smaller are attenuated by the damper with near zero friction due to the flexural washer 181 (which is identical to washer 157 of FIGS. 4 and 5) and its counterpart (not shown) within wall 12a holding the piston rod 32 centered, while the possibility exists that a hydrodynamic seal is not formed between bushing 172 and piston rod 32. For motions in the range of 1,000th of an inch to 5,000th of an inch, the labyrinth bushing 172 will move slightly within its bore, as permitted by the coil springs 174 and 175. A like action is obtained within end wall 12a between the labyrinth bushing and the coil springs therein which are mirror images of those in end wall 13a. In this range, some amount of friction may be generated by bushing 172 touching bore 170 when axial motion of the bushing occurs, but a hydrodynamic film will be quickly built up between the outside diameter of bushing 172 and its bore 170. As motions become larger and approach the ¼ inch range, most of the axial motion of rod 32 will end up as a displacement of bushing 172 and its counterpart within end wall 12a except for the relatively small amount of flexing of washer 181 as it transmits motion from the rod 32 to bushing 172. A like action occurs within end wall 12a because of the interaction of the structure therein which are mirror image counterparts of bushing 172, washer 181, spring 174 and spring 175. In other words, when the bushing 172 and its mirror image counterpart in end wall 12a are moved axially with rod 32 because they are connected thereto, such movement will be permitted because of the springs which are positioned on opposite sides of the bushings, in this instance springs 174 and 175 within end wall 13a and mirror image counterpart springs within end wall 12a.

While FIG. 6 has shown bushing 172 and its mirror image counterpart within end wall 12a as being labyrinth types of bushings, it will be appreciated that the bushings may also be of the types such as shown at 253 and 521 in FIG. 5.

In FIG. 7 a further modified embodiment of the present invention is shown which is a damper-snubber 10c in that it functions as a damper under certain conditions and functions as a snubber under other conditions. Damper-snubber 10c is a modified version of damper-snubber 10' shown in FIG. 3 of U.S. Pat. No. 4,638,895 in that it includes end walls 12a and 13a which are fully described above relative to FIG. 6. Damper-snubber 10c includes an annular cylinder 85 which may be identical to annular cylinder 11 and may have a cylinder extension 87 which is identical to cylinder extension 25. It will be appreciated that an attachment member, such as 69 of FIG. 1, is mounted on the end of shaft 89. End walls 12a and 13a are identical to those shown in FIG. 6 and they contain identical elements of structure which are denoted by the identical numerals used in FIG. 6. In addition, bellows 60' and 61' are identical to those described above relative to FIG. 6 and further are attached to the end walls and other structure in the same manner as described above relative to FIG. 6.

A piston head 97 includes a central portion 99 which is mounted on central portion 100 of shaft 89. A low friction seal 98 is mounted on piston head 97. This seal 98 may be of the type which acts to provide sealing only when it is subjected to high fluid pressure in either of the cylinder chambers. Alternatively, seal 98 may be of the type which merely does not produce much friction, or it might be a frictionless labyrinth seal of the type shown at 52 and 53. The outer end portions of shaft 89 are supported in a frictionless manner in end walls 12a and 13a in labyrinth seals such as 172 as described above relative to FIG. 6 or they may be supported in frictionless bushings such as shown in FIG. 5. Nuts 101 and 102 are threaded onto the central portion 100 of shaft 89 and secure piston head 97 in position. A plurality of circumferentially placed bores 104 are located in piston head 97. Annular valve members 105 and 107 are slidably mounted on central portion 99 of piston head 97. O-rings 110 normally bias valve member away from bores 104 and against split ring 111. O-rings 112 normally bias valve member 107 away from bores 104 and against split ring 113. Alternate means, such as coil springs or equivalent structure, can be substituted for O-rings 110 and 112.

During normal movement of piston head 97 to the right or left below a predetermined velocity, there can be flow between cylinder chambers 94 and 95 through bores 104, and there should be no significant leakage through the labyrinth or bushing in end walls 12a and 13a seals to the bellows chambers. The flow of fluid through bores 104 will create a damping action. If for any reason the velocity of piston head 97 should exceed a predetermined value, either valve 105 or 107 will block off bores 104 and thus the damper will act as a snubber because fluid will be prevented from flowing through bores 104. For example, if the velocity of piston head 97 should exceed a predetermined value as piston head 97 is moving to the right, valve member 107 will move to the left against the bias of O-rings 112 and thus close bores 104 to cause the damper to function as a snubber. Conversely, if the velocity of the piston head to the left should exceed the predetermined value, the fluid pressure will cause valve member 105 to compress O-rings 110 and move to a position wherein it closes bores 104 to thus prevent hydraulic fluid from moving from chamber 94 to chamber 95 and thus cause the damper 10c to act as a snubber. As explained above relative to FIG. 6, any fluid passing through walls 12a and 13a will enter bellows chambers 79 or 80, respectively, and since there is communication between the bellows chambers 79 and 80 through shaft bore 81 and cross bores, such as 82 and 83 of FIGS. 1 and 2 (not shown in FIGS. 6 and 7), the flow will be equalized.

While preferred embodiments of the present invention have been disclosed, it will be appreciated that the present invention is not limited thereto but may be otherwise embodied within the scope of the following claims.

What is claimed is:

1. A damper comprising a cylinder, first and second opposite end walls in said cylinder, first and second seals in said first and second end walls, respectively, an elongated shaft having end portions and mounted for axial movement in said first and second seals, a piston head on said shaft located between said first and second end walls, first and second fluid-tight bellows mounted in sealed relationship between said shaft and said first and second end walls, respectively, fluid in said cylinder and in said first and second bellows, and first and second flexible washers mounted between said end portions of said shaft and said first and second end walls, respectively.

2. A damper as set forth in claim 1 including vent holes in said first and second flexible washers.

3. A damper as set forth in claim 1 wherein said first and second flexible washers are located between said first and second end walls, respectively, and said first and second bellows, respectively.

4. A damper as set forth in claim 3 including vent holes in said first and second flexible washers.

5. A damper as set forth in claim 1 including bores in said first and second end walls, and wherein said first and second seals are movably mounted within said first and second bores, respectively, and wherein said first and second flexible washers are mounted between said first and second seals, respectively, and said end portions of said shaft.

6. A damper as set forth in claim 5 including first springs mounted on opposite sides of said first seal in said first bore, and second springs mounted on opposite sides of said second seal in said second bore.

7. A damper as set forth in claim 6 including first and second vents in said first and second seals, respectively, located radially outwardly of said first and second flexible washers, respectively.

8. A damper as set forth in claim 1 wherein said flexible washers are in the form of discs.

9. A damper comprising a cylinder, first and second opposite end walls in said cylinder, an elongated shaft having a central portion between said first and second end walls, first and second outer end portions on said shaft on opposite sides of said central portion, said first and second outer end portions of said shaft extending through said first and second end walls, respectively, a piston head mounted on said central portion of said shaft and dividing the space in said cylinder between said first and second end walls into a first cylinder chamber proximate said first end wall and a second cylinder chamber proximate said second end wall, fluid in said first and second cylinder chambers, first and second seals in said first and second end walls, respectively, for mounting said first and second outer end portions of said shaft, respectively, for sliding movement, first and second fluid-tight bellows mounted in sealed relationship between said first and second outer end portions of said shaft, respectively, and said first and second end walls, respectively, on the opposite sides of said first and second end walls from said first and second cylinder chambers, respectively, for providing first and second bellows chambers, respectively, fluid in said first and second bellows chambers, conduit means interconnecting said first and second bellows chambers to permit communication therebetween, and first and second flexible washers mounted between said first and second end portions of said shaft, respectively, and said first and second end walls, respectively.

10. A damper as set forth in claim 8 including first and second vent holes in said first and second flexible washers, respectively.

11. A damper as set forth in claim 9 wherein said first and second flexible washers are located between said first and second end walls, respectively, and said first and second bellows, respectively.

12. A damper as set forth in claim 11 including first and second vent holes in said first and second flexible washers, respectively.

13. A damper as set forth in claim 9 including first and second bores in said first and second end walls, respectively, and wherein said first and second seals are movably mounted within said first and second bores, respectively, and wherein said first and second flexible washers are mounted between said first and second seals, respectively, and said first and second end portions of said shaft, respectively.

14. A damper as set forth in claim 13 including first springs mounted on opposite sides of said first seal in said first bore, and second springs mounted on opposite sides of said second seal in said second bore.

15. A damper as set forth in claim 14 including first and second vents in said first and second seals, respectively, located radially outwardly of said first and second flexible washers, respectively.

16. A damper as set forth in claim 9 wherein said conduit means comprise bore means in said shaft.

17. A damper as set forth in claim 16 wherein said bore means comprises a first bore extending longitudinally of said shaft, a second bore extending transversely to said first bore and in communication with both said first bore and said first bellows chamber, and a third bore extending transversely to said first bore and in communication with both said first bore and said second bellows chamber.

18. A damper as set forth in claim 9 including orifice means operatively associated with said piston head for permitting flow of fluid past said piston head between said first and second cylinder chambers during movement of said piston head, and valve means in said piston head for selectively reducing flow through said orifice means when said piston head experiences a velocity above a predetermined value to thereby cause said damper to function as a snubber.

19. A damper as set forth in claim 18 wherein said orifice means comprises bore means in said piston head, and wherein said valve means comprises a valve member, and means for movably mounting said valve member relative to said piston head.

20. A damper as set forth in claim 18 wherein said orifice means comprises bore means in said piston head, and wherein said valve means comprises first and second valve members, and means for movably mounting said first and second valve members on opposite sides of said piston head to selectively close said bore means in both directions of movement of said piston head.

21. A damper as set forth in claim 9 including a clearance space between said piston head and said cylinder.

22. A damper as set forth in claim 21 including bore means in said piston head, and valve means for selectively opening said bore means when the velocity of said piston head exceeds a predetermined value.

23. A damper as set forth in claim 9 wherein said flexible washers are in the form of discs.

24. A damper-snubber comprising a cylinder, end walls in said cylinder, a shaft, seals in said end walls, portions of said shaft in said seals, end portions of said shaft extending outwardly beyond said seals, a bellows mounted in fluid-tight relationship between each of said end walls and its adjacent end portion of said shaft, fluid in said cylinder and in both of said bellows, a piston head on said shaft in said cylinder, orifice means located relative to said piston head to permit flow of fluid past said piston head when said piston head moves below a predetermined velocity to thereby cause said damper-snubber to function as a damper, conduit means effecting communication between both of said bellows, first means on said shaft for attachment to a first external object, second means on said cylinder for attachment to a second external object which is movable relative to said first external object, valve means for selectively closing said orifice means when said piston head moves above said predetermined velocity to cause said damper-snubber to function as a snubber, and flexible washers mounted between said end portions of said shaft and said end walls.

25. A damper-snubber as set forth in claim 24 wherein said flexible washers are located between said end walls and said bellows.

26. A damper-snubber as set forth in claim 25 including vent holes in said flexible washers.

27. A damper-snubber as set forth in claim 22 including bores in said end walls, and wherein said seals are movably mounted in said bores.

28. A damper-snubber as set forth in claim 27 wherein said flexible washers are mounted between said seals and said end portions of said shaft.

29. A damper-snubber as set forth in claim 28 including springs in said bores mounted on opposite sides of said seals.

30. A damper-snubber as set forth in claim 29 including vents in said seals located radially outwardly of said flexible washers.

31. A damper as set forth in claim 24 wherein said flexible washers are in the form of discs.

* * * * *

UNITED STATES PATENT AND TRADEMARK OFFICE
CERTIFICATE OF CORRECTION

PATENT NO. : 6,216,831 B1
DATED : April 17, 2001
INVENTOR(S) : Douglas P. Taylor Page 1 of 1

It is certified that error appears in the above-identified patent and that said Letters Patent is hereby corrected as shown below:

Column 9, claim 10,
Line 30, change "8" to -- 9 --.

Column 10, claim 27,
Line 50, change "22" to -- 24 --.

Signed and Sealed this

First Day of January, 2002

Attest:

Attesting Officer

JAMES E. ROGAN
Director of the United States Patent and Trademark Office